United States Patent
Wood et al.

(10) Patent No.: US 10,295,420 B2
(45) Date of Patent: May 21, 2019

(54) NACELLE DEFLECTION MEASUREMENT ASSEMBLY

(71) Applicant: United Technologies Corporation, Farmington, CT (US)

(72) Inventors: Joshua V. Wood, East Hartford, CT (US); Michael Joseph Murphy, Windsor, CT (US); Justin R. Urban, Tolland, CT (US); Robert E. Malecki, Storrs, CT (US); William W. Rice, South Glastonbury, CT (US); David W. Lamarre, Colchester, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 320 days.

(21) Appl. No.: 15/095,199

(22) Filed: Apr. 11, 2016

(65) Prior Publication Data

US 2017/0292882 A1 Oct. 12, 2017

(51) Int. Cl.
| | |
|---|---|
| G01L 5/13 | (2006.01) |
| B64C 7/02 | (2006.01) |
| B64D 27/10 | (2006.01) |
| G01M 15/14 | (2006.01) |
| F01D 21/00 | (2006.01) |
| F02K 1/15 | (2006.01) |

(52) U.S. Cl.
CPC ............ *G01L 5/133* (2013.01); *B64C 7/02* (2013.01); *B64D 27/10* (2013.01); *F01D 21/003* (2013.01); *F02K 1/15* (2013.01); *G01M 15/14* (2013.01); *F05D 2260/50* (2013.01); *F05D 2270/80* (2013.01); *F05D 2270/821* (2013.01)

(58) Field of Classification Search
CPC ............. G01L 5/133; F02K 1/15; B64C 7/02
See application file for complete search history.

(56) References Cited

U.S. PATENT DOCUMENTS

| | | | |
|---|---|---|---|
| 3,233,405 A | 2/1966 | Hicks et al. | |
| 5,385,013 A | 1/1995 | Barron et al. | |
| 5,524,847 A | 6/1996 | Brodell et al. | |
| 8,235,325 B2 | 8/2012 | Schafer | |
| 8,904,750 B2 | 12/2014 | Hillel et al. | |
| 2011/0120079 A1 | 5/2011 | Schwark, Jr. et al. | |
| 2013/0160425 A1 | 6/2013 | Scanlon et al. | |
| 2013/0312387 A1* | 11/2013 | West | F02K 1/09 60/226.2 |
| 2016/0281639 A1* | 9/2016 | Jackowski | F02K 1/12 |

FOREIGN PATENT DOCUMENTS

WO 2008045034 4/2008

OTHER PUBLICATIONS

European Search Report for European Patent Application No. 17166095 completed Aug. 23, 2017.

* cited by examiner

*Primary Examiner* — Eric S. McCall
*Assistant Examiner* — Timothy P Graves
(74) *Attorney, Agent, or Firm* — Carlson, Gaskey & Olds, P.C.

(57) ABSTRACT

A deflection measurement assembly according to an example of the present disclosure includes, among other things, a nacelle arranged about an axis to define a flow path, a cable assembly arranged at least partially about the axis, and a transducer coupled to the cable assembly.

11 Claims, 8 Drawing Sheets

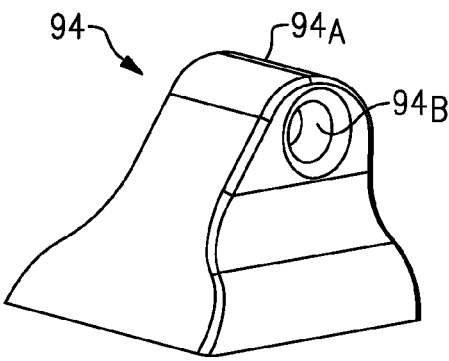
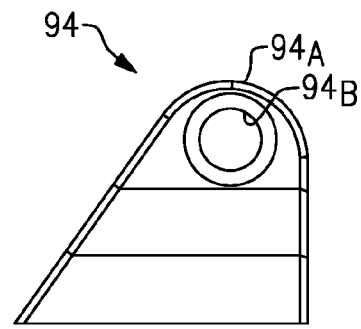
FIG.4A  FIG.4B
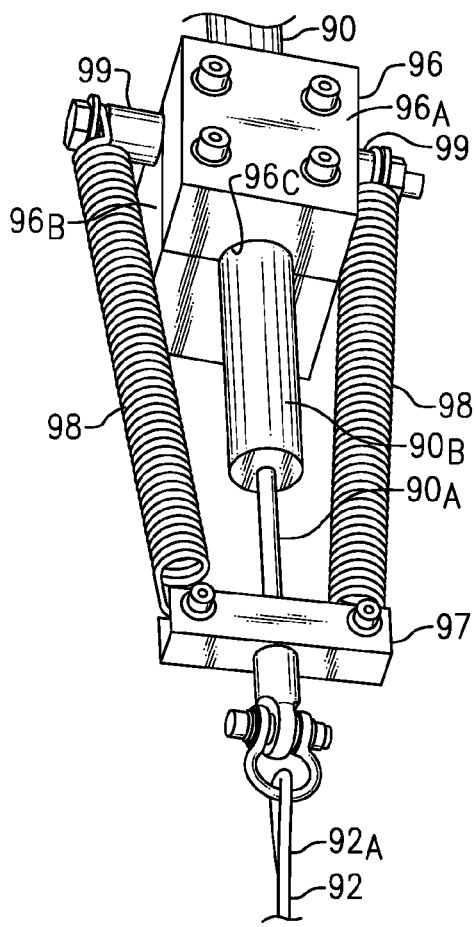
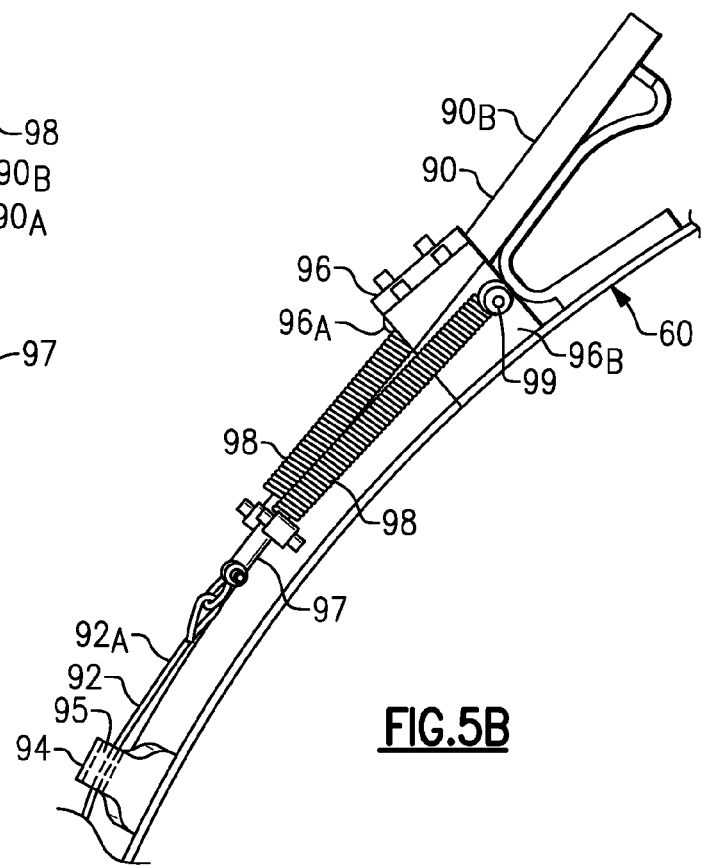
FIG.5A  FIG.5B

NACELLE DEFLECTION MEASUREMENT ASSEMBLY

BACKGROUND

This disclosure relates to measuring deflection of a nacelle assembly under pressure loads.

Gas turbine engines can include a fan for propulsion air. The fan also delivers air into a core engine where it is compressed. The compressed air is then delivered into a combustion section, where it is mixed with fuel and ignited. The combustion gas expands downstream over and drives turbine blades. The fan and gas turbine engine can be surrounded by a nacelle to direct incoming airflow to the engine and to a bypass duct. The propulsion air exerts pressure loads on surfaces of the nacelle.

SUMMARY

A deflection measurement assembly according to an example of the present disclosure includes a nacelle arranged about an axis to define a flow path, a cable assembly arranged at least partially about the axis, and a transducer coupled to the cable assembly.

In a further embodiment of any of the foregoing embodiments, the cable assembly includes at least one cable disposed at least partially about a periphery of the nacelle.

In a further embodiment of any of the foregoing embodiments, the transducer is coupled to a first end of the at least one cable.

In a further embodiment of any of the foregoing embodiments, the transducer is coupled to a second end of the at least one cable.

A further embodiment of any of the foregoing embodiments, the assembly includes a mount that has a first portion fixedly attached to the nacelle and a second portion fixedly attached to the transducer.

In a further embodiment of any of the foregoing embodiments, the transducer is a linear variable differential transducer.

A further embodiment of any of the foregoing embodiments, the assembly includes a controller coupled to the transducer. The controller is operable to determine a deflection of the nacelle in response to actuation of the transducer.

In a further embodiment of any of the foregoing embodiments, the deflection relates to a change in a cross-sectional area of the flow path at a location corresponding to the cable assembly.

In a further embodiment of any of the foregoing embodiments, the nacelle includes an annular body extending between a leading edge region and a trailing edge region, and the cable assembly is situated adjacent to the trailing edge region.

In a further embodiment of any of the foregoing embodiments, the trailing edge region is moveable relative to the leading edge region.

A propulsion system according to an example of the present disclosure includes a gas turbine engine defining an engine axis, the engine including a turbine section configured to drive a fan section, a nacelle assembly including a fan nacelle and a core cowling arranged about the engine axis to define a bypass flow path, the core cowling defining a core flow path, and a deflection measurement assembly including a cable assembly coupled to the nacelle assembly and a transducer coupled to the cable assembly. The transducer is configured to be actuated in response to a change in a cross-sectional area of at least one of the bypass flow path and the core flow path.

In a further embodiment of any of the foregoing embodiments, the transducer is a linear variable differential transducer.

In a further embodiment of any of the foregoing embodiments, the cable assembly is arranged at least partially about the engine axis.

A further embodiment of any of the foregoing embodiments, a controller is coupled to the transducer. The controller is operable to determine a deflection of the nacelle assembly based upon the change in the cross-section area.

In a further embodiment of any of the foregoing embodiments, the cable assembly includes at least one cable disposed along a perimeter of the nacelle assembly.

In a further embodiment of any of the foregoing embodiments, the fan nacelle is fixedly attached to a pylon, the transducer is coupled to a first end of the at least one cable, and a second end of the at least one cable is coupled to the pylon.

A method of measuring deflection of a nacelle assembly according to an example of the present disclosure includes providing a nacelle defining a flow path that extends along an axis, and positioning a cable assembly about the axis. The cable assembly is moveable relative to the axis in response to a change in a cross-sectional area of the flow path, and actuates a transducer is response to movement of the cable assembly.

In a further embodiment of any of the foregoing embodiments, the cable assembly includes at least one cable disposed along a perimeter of the nacelle, and the transducer is coupled to a first end of the at least one cable.

A further embodiment of any of the foregoing embodiments includes determining a deflection of the nacelle at a location adjacent to the cable assembly based upon the step of actuating the transducer.

In a further embodiment of any of the foregoing embodiments, the step of determining the deflection of the nacelle includes comparing the change in the cross-section area to a predetermined quantity.

The various features and advantages of this invention will become apparent to those skilled in the art from the following detailed description of an embodiment. The drawings that accompany the detailed description can be briefly described as follows.

BRIEF DESCRIPTION OF THE DRAWINGS

FIG. 4A illustrates a perspective view of an example guide.

FIG. 4B illustrates a side view of the guide of FIG. 4A.

FIG. 5A illustrates a perspective view of selected portions of the deflection measurement assembly of FIG. 3A.

FIG. 5B illustrates a side view of the deflection measurement assembly of FIG. 5A.

DETAILED DESCRIPTION

Figure 1:
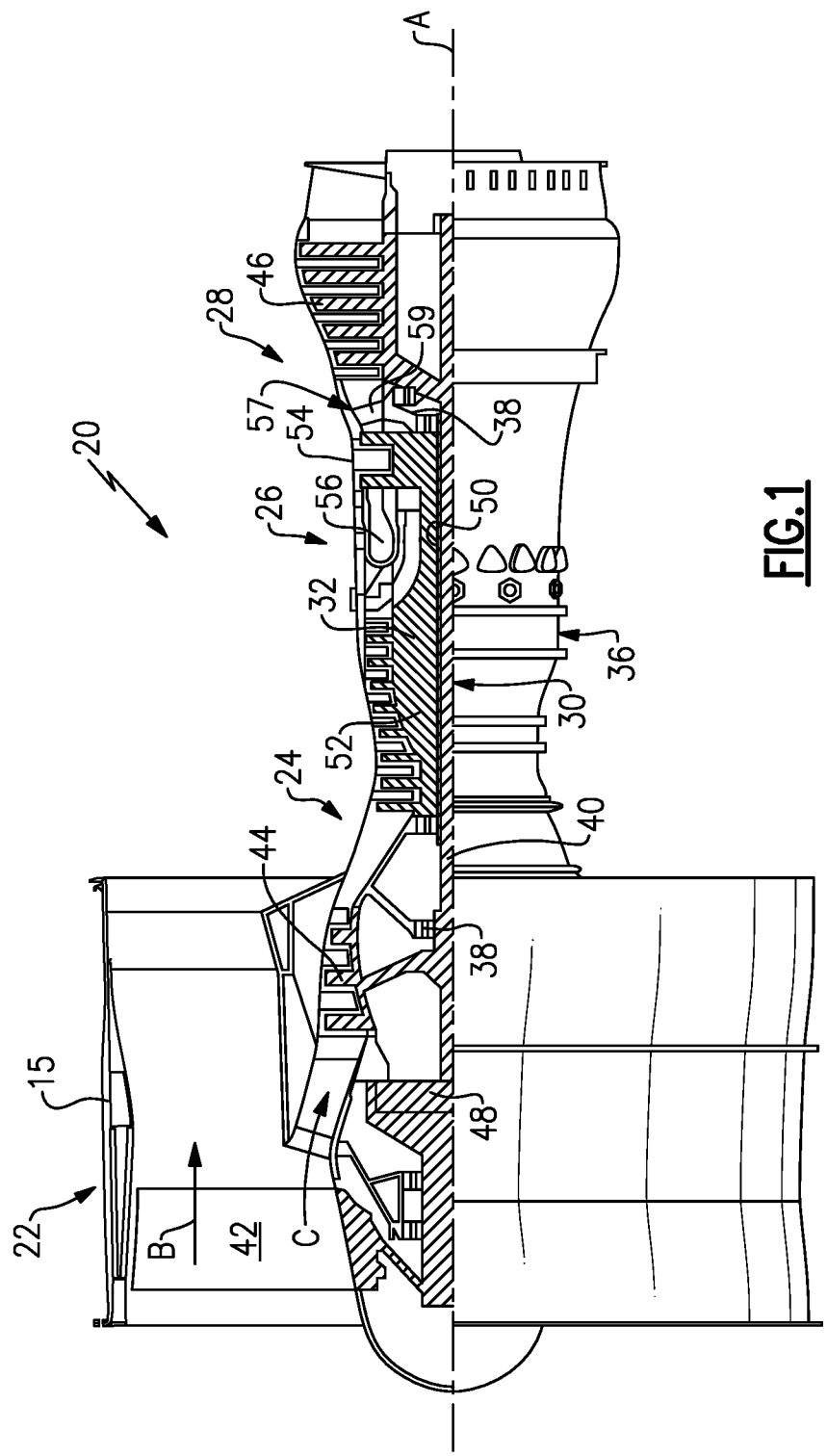
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFCT')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second.

Figure 2A:
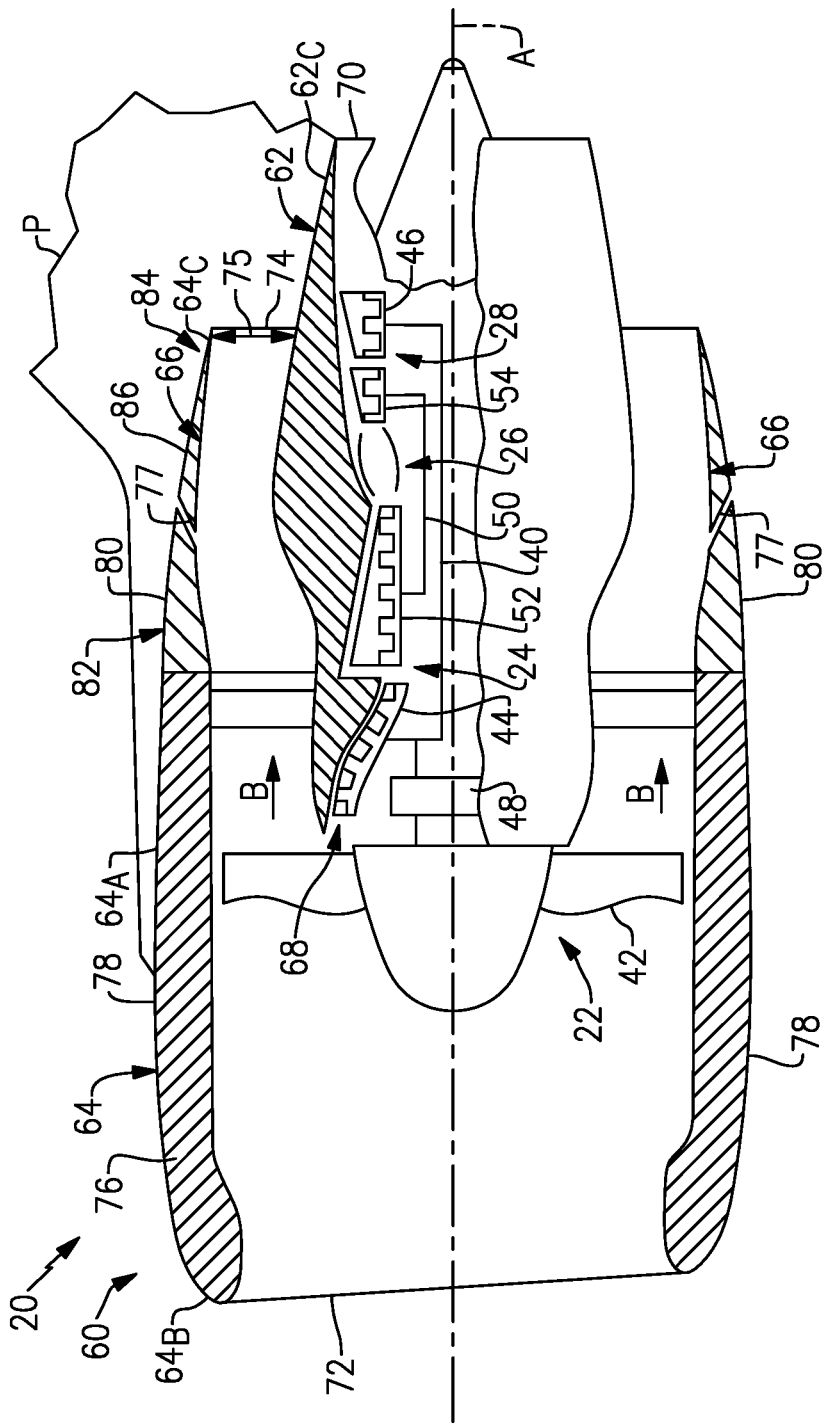
FIG. 2A illustrates an example nacelle assembly including a thrust reverser and a variable area nozzle each in a stowed position.
Figure 2B:
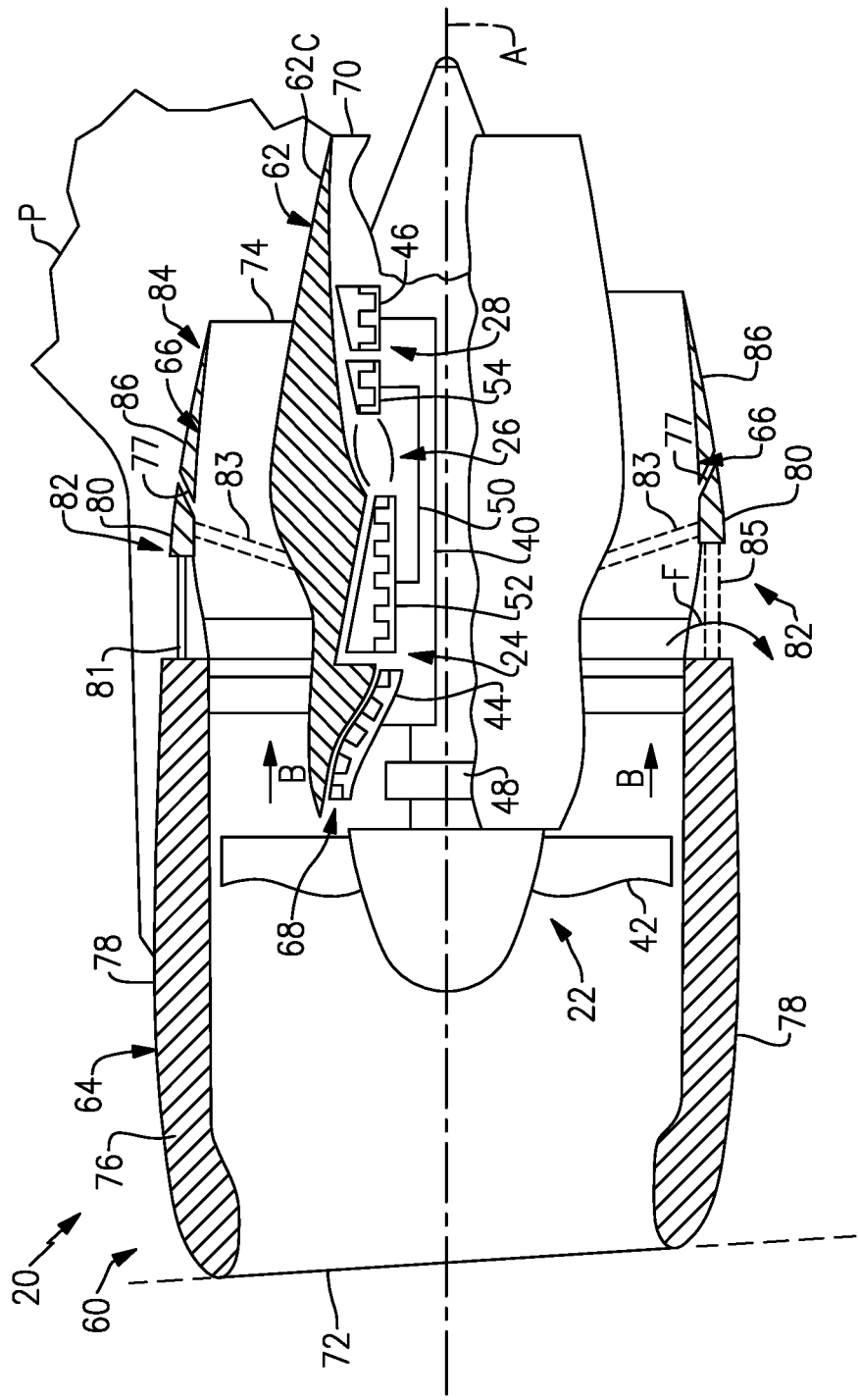
FIG. 2B illustrates the example nacelle assembly of FIG. 2A with the thrust reverser in a deployed position and the variable area nozzle in the stowed position.
Figure 2C:
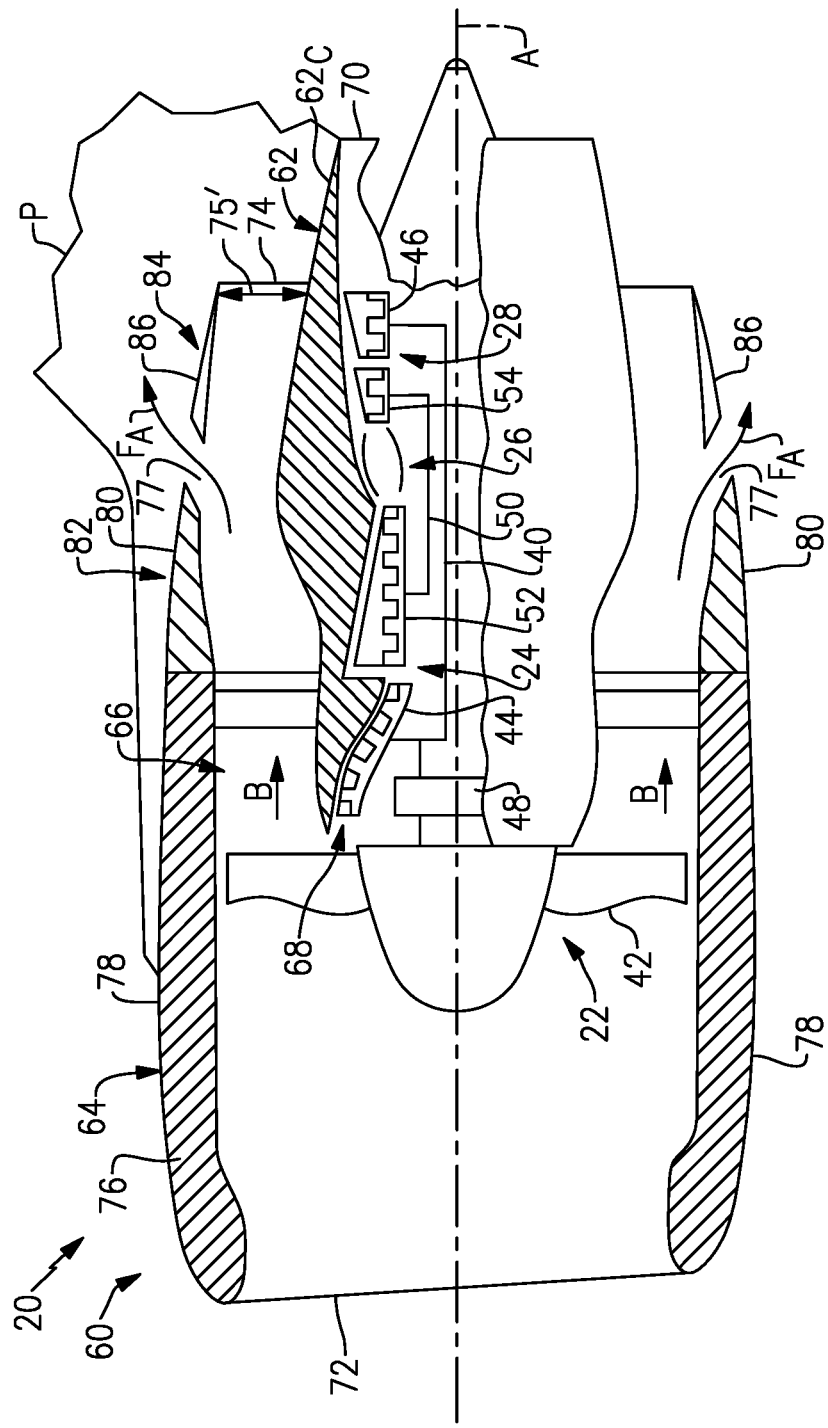
FIG. 2C illustrates the example nacelle assembly of FIG. 2A with the thrust reverser in the stowed position and the variable area nozzle in a deployed position.

Referring to FIGS. 2A to 2C, a nacelle assembly 60 is shown disposed about the engine axis A. In this disclosure, like reference numerals designate like elements where appropriate and reference numerals with the addition of one-hundred or multiples thereof designate modified elements that are understood to incorporate the same features and benefits of the corresponding original elements. The nacelle assembly 60 can be fixedly attached to a pylon P. The pylon P is configured to support the nacelle assembly 60 and engine 20 on an aircraft. The nacelle assembly 60 includes a core cowling 62, a fan nacelle 64 and a bypass duct 66 defining the bypass flow path B.

The core cowling 62 extends circumferentially around, and at least partially houses, the engine sections 24, 26, 28 and geared architecture 48. The core cowling 62 extends axially along the engine axis A between a core inlet 68 and a core nozzle 70 to define the core flow path C. The core nozzle 70 defines an exhaust flow path for combustion products communicated from the turbine section 28.

The fan nacelle 64 extends circumferentially around and houses the fan 42 and at least a portion of the core cowling 62 to define the bypass flow path B. The fan nacelle 64 includes an annular body $64_A$ that extends axially along the engine axis A between a nacelle inlet 72 and a bypass nozzle 74 of the bypass flow path B. A leading edge region $64_B$ of fan nacelle 64 defines the nacelle inlet 72. The leading edge region $64_B$ extends axially between the nacelle inlet 72 and the fan 42. A trailing edge region $64_C$ of the fan nacelle 64 defines the bypass nozzle 74. The fan nacelle 64 can include one or more segments fixed or moveable relative to each other and/or the engine axis A. The bypass nozzle 74 can be substantially fixed relative to the nacelle inlet 72 such that an exit area of the bypass flow path B remains substantially constant.

In the illustrated example of FIGS. 2A-2C, the nacelle assembly 60 includes a thrust reverser 82 and a variable area nozzle 84 for adjusting various characteristics of the bypass flow path B. FIG. 2A illustrates the thrust reverser 82 and the variable area nozzle 84 in stowed positions. FIG. 2B illustrates the thrust reverser 82 in a deployed position and the variable area nozzle 84 in a stowed position. FIG. 2C illustrates the thrust reverser 82 in the stowed position and the variable area nozzle 84 in a deployed position. In alternative examples, the nacelle assembly 60 includes only one of the thrust reverser 82 and variable area nozzle 84.

The fan nacelle 64 includes a stationary first nacelle section 78 and a second nacelle section 80 aft of the first nacelle section 78. The second nacelle section 80 is moveable relative to the first nacelle section 78. The second nacelle section 80 can translate along a supporting structure such as a plurality of guides or tracks 81 (FIG. 2B).

The thrust reverser 82 can include one or more cascades 85 of turning vanes and blocker doors 83 (shown in dashed lines) arranged circumferentially around the engine axis A to direct flow F from the bypass flow path B for providing reverse engine thrust. In alternative examples, the thrust reverser 82 is configured without blocker doors. The second nacelle section 80 is moveable relative to the first nacelle section 78 to deploy and stow the cascades 85.

The variable area nozzle 84 is defined by a third nacelle section 86 of the fan nacelle 64. The third nacelle section 86 is moveable between the stowed position of FIGS. 2A-2B and the deployed position of FIG. 2C utilizing one or more actuators. In the illustrated example, the first nacelle section 78 defines the leading edge region $64_B$ and the third nacelle section 86 defines the trailing edge region 64c of the fan nacelle 64. In alternative examples, the second nacelle section 80 defines the trailing edge region $64_C$.

As the third nacelle section 86 translates aftwards relative to the engine axis A, a radial distance 75 of the bypass nozzle 74 between a trailing edge of the third nacelle section 86 and the core cowling 62 may change (e.g., increase) to radial distance 75' and thereby change (e.g., increase) a flow area of the bypass nozzle 74. In this manner, the variable area nozzle 84 may adjust a pressure ratio across the bypass flow path B by changing the flow area of the bypass nozzle 74.

The variable area nozzle 84 can define at least one auxiliary port 77 to affect the bypass flow. In the illustrated example, the auxiliary port 77 is defined between an upstream portion of the second nacelle section 80 and the third nacelle section 86 as the third nacelle section 86 translates axially aftwards relative to the upstream portion. Communication of flow $F_A$ (FIG. 2C) through auxiliary port 77 increases an effective flow area of the variable area nozzle 84. The variable area nozzle 84 therefore may adjust a pressure ratio across the bypass flow path B. In alternative examples, the variable area nozzle 84 includes one or more bodies (e.g., flaps similar to blocker doors 83) that may move radially and/or axially to change the flow area of the bypass nozzle 74.

Figures 3A, 3B:
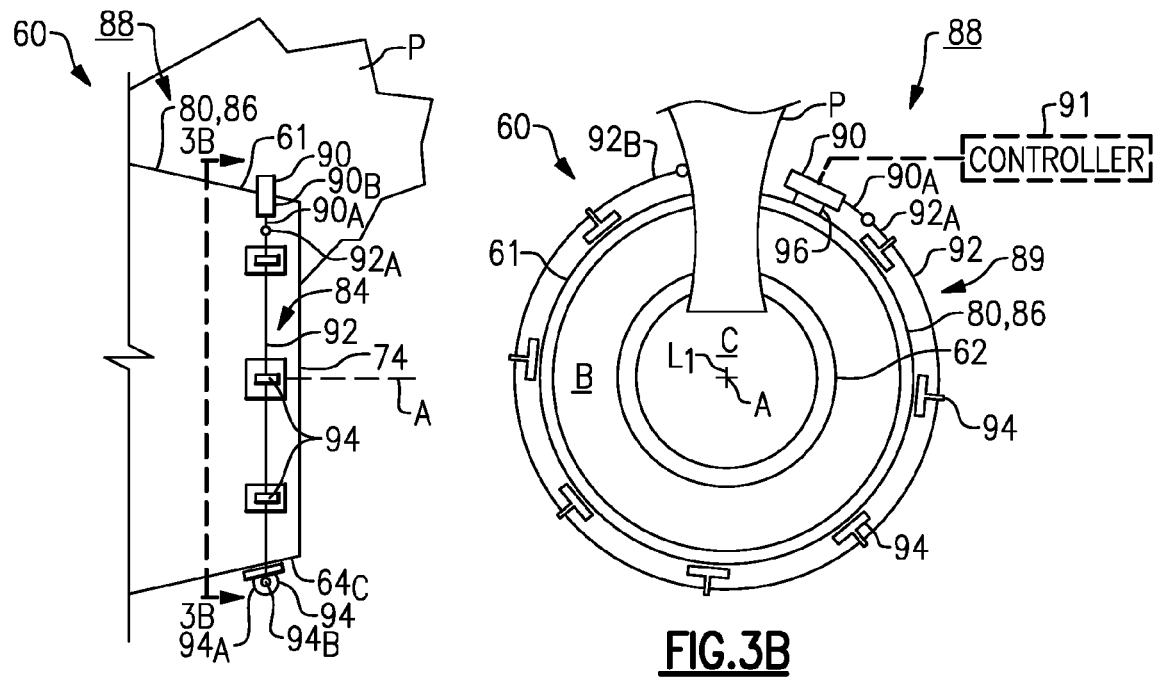
FIG. 3A illustrates a side view of an example deflection measurement assembly.
FIG. 3B illustrates an axial view of the deflection measurement assembly of FIG. 3A.

FIGS. 3A-3B illustrate a deflection measurement assembly 88, according to an example. The deflection measurement assembly 88 is operable to determine or sense a change in a cross-sectional area of the bypass or core flow paths B, C due to a change in loads caused by pressure loads exerted on surfaces of the nacelle assembly 60 during engine operation or test conditions. The deflection measurement assembly 88 may utilize the sensed change in the cross-sectional area to determine a deflection of the nacelle assembly 60 at a corresponding location of the cross-section.

The deflection measurement assembly 88 includes a cable assembly 89 and at least one transducer 90 actuated by the cable assembly 89. In the illustrated example, the transducer 90 is a linear variable differential transducer (LVDT). The transducer 90 includes an actuator $90_A$ moveable relative to a body $90_B$, and can be spring loaded to return the actuator $90_A$ to a neutral position or state. In another example, the transducer 90 is a rotary variable differential transducer (RVDT). Other example transducers can include a load cell responsive to force changes caused by movement of the cable assembly 89. For example, body $90_B$ can be a tension load cell, and actuator $90_A$ can be a linkage rod $90_A$ coupled to the tension load cell.

Figure 8:
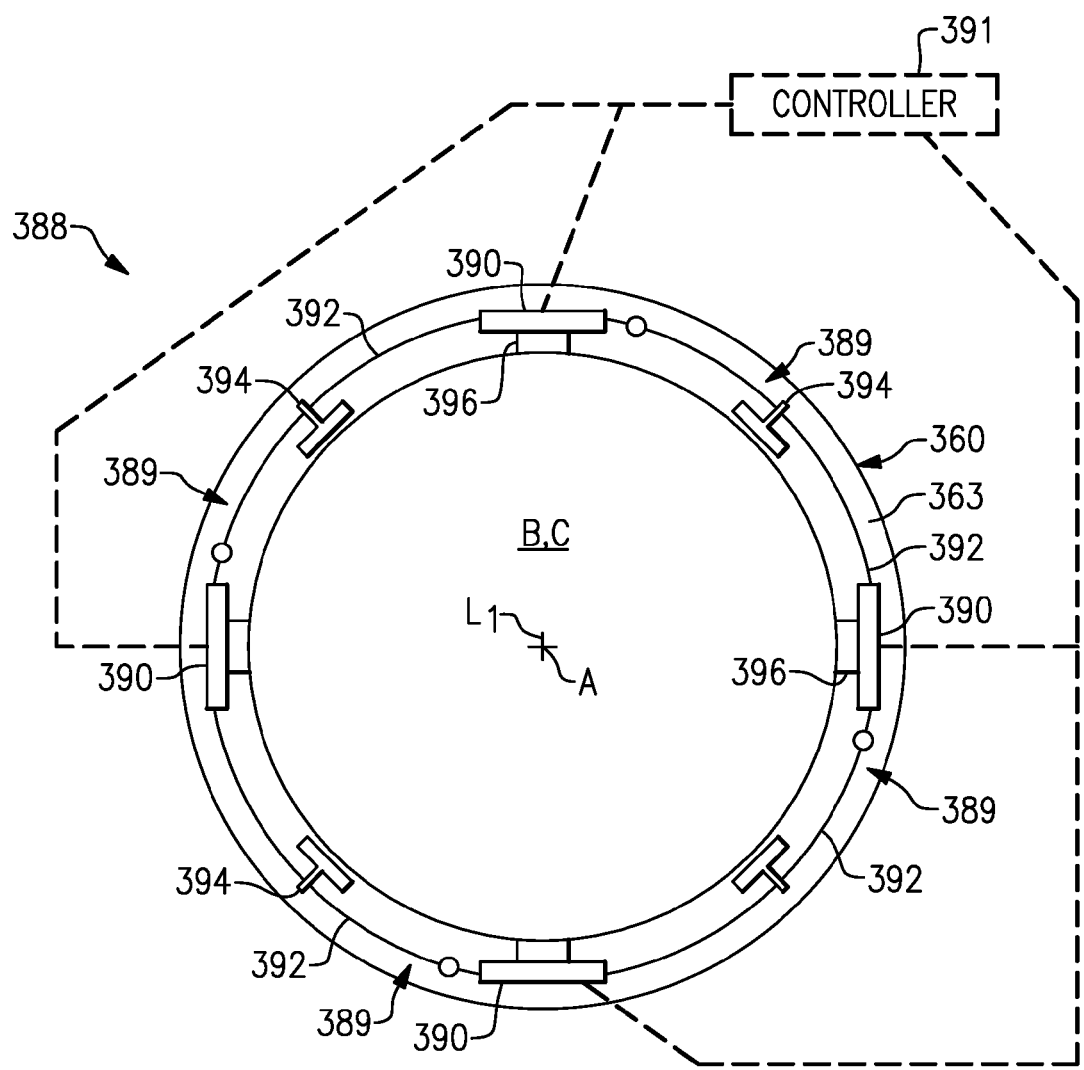
FIG. 8 illustrates a deflection measurement assembly according to a fourth embodiment.

The cable assembly 89 includes at least one cable 92 or cable segments circumferentially arranged at least partially about the engine axis A. The cable 92 can be disposed at least partially about a peripheral region 61 of the nacelle assembly 60. The peripheral region 61 can be defined as a perimeter of one of the first, second or third nacelle sections 78, 80, 86 of the nacelle assembly 60, the core cowling 62, or along the bypass or core flow paths B, C. In the illustrated example of FIG. 3B, the cable 92 is adjacent to an outer diameter of the bypass nozzle 74 to form a partial loop which extends at least 180 degrees about the engine axis A. The cable assembly 89 can be situated at other locations of the nacelle assembly 60, such as an inner or outer diameter of core cowling 62 adjacent to the core nozzle 70. The cable 92 can be configured to extend less than 180 degrees about the engine axis A to determine deflection of a localized region of the nacelle assembly 60. In some examples, the deflection measurement assembly includes an array of transducers and cable assemblies arranged about the engine axis A to determine deflection at different localized areas of the nacelle assembly 60. For example, FIG. 8 illustrates deflection measurement assembly 388 having a plurality of transducers 390 arranged about engine axis A, with each transducer 390 coupled to a corresponding cable assembly 289.

A length of the cable 92 extends through one or more guides 94 positioned at spaced intervals along the nacelle assembly 60. Each guide 94 includes a body $94_A$ attachable to the nacelle assembly 60. The body $94_A$ defines a contoured opening $94_B$ for routing a portion of the cable 92, as illustrated by FIGS. 4A and 4B. A first end $92_A$ of the cable 92 is fixedly attached or otherwise coupled to actuator $90_A$ of the transducer 90, and a second end $92_B$ of the cable 92 is fixedly attached or otherwise coupled to the pylon P. In alternative examples, the second end $92_B$ is fixedly attached to the nacelle assembly 60.

Referring to FIGS. 5A and 5B, the deflection measurement assembly 88 includes a mount 96 configured to attach the transducer 90 to the nacelle assembly 60. The mount 96 includes a first portion $96_A$ and a second portion $96_B$. The first and second portions $96_A$, $96_B$ can define a passage $96_C$ for receiving a portion of the transducer 90. The first portion $96_A$ can be fixedly attached to the transducer 90, and the second portion $96_B$ can be fixedly attached to the nacelle assembly 60 at a desired location. The first and second portions $96_A$, $96_B$ are fixedly attached by one or more fasteners such that relative movement is minimized. In other examples, the first portion $96_A$ is moveable relative to the second portion $96_B$ such that the transducer 90 is moveable relative to the nacelle assembly 60.

The mount 96 includes a cable interface 97 and one or more springs 98, with the first end $92_A$ of the cable 92 coupled to the cable interface 97. Each spring 98 is coupled to the cable interface 97 and to a post 99 extending from the mount 96. The springs 98 bias the cable 92 towards the transducer 90 to provide a desired amount of tension on the cable 92. In alternative examples, the first end $92_A$ of the cable 92 is attached to the actuator $90_A$ via a spring to provide a desired tension, or is directly attached to the actuator $90_A$.

Referring back to FIG. 3B, the deflection measurement assembly 88 includes a controller 91 coupled to secondary coils of the transducer 90. The controller 91 is configured to measure a linear displacement of actuator $90_A$ based upon measured induced voltage changes caused by movement of a core of the actuator $90_A$ relative to primary and secondary coils of the transducer 90. The controller 91 is operable to determine a deflection of the nacelle assembly 60 at a desired location $L_1$ corresponding to the cable assembly 89 based upon the displacement. The desired location $L_1$ can include any of the locations discussed herein relative to the nacelle assembly 60 and/or engine axis A. The controller 91 is operable to determine the deflection based on comparing the voltage changes of the transducer 90 to one or more predetermined values.

The controller 91 typically includes a processor, a memory and an interface. The processor may, for example only, be any type of known microprocessor having desired performance characteristics. The memory may, for example only, includes UVPROM, EEPROM, FLASH, RAM, ROM, DVD, CD, a hard drive, or other computer readable medium which may store data and an algorithm for operation of the deflection measurement assembly as described herein. The interface facilitates communication with the other systems or components of the engine 20 or aircraft. The controller 91 can be a portion of a full authority digital engine control (FADEC) such as an electronic engine controller (EEC), another system, or a stand-alone system, for example.

During operation, deflection can occur due to pressure loads which cause surfaces of the nacelle assembly 60 to move radially outward. The cable assembly 89 is moveable relative to the engine axis A in response to a change in a cross-sectional area of the flow path. The transducer 90 is actuated in response to movement of the cable assembly 89 caused by a change in the effective length of the cable assembly 89. The controller 91 is operable to determine a change in the cross-sectional area based on comparing the displacement of the actuator $90_A$ to a predetermined quantity at a corresponding operating condition. The corresponding operating condition may be full power of the engine 20 or another operating condition, such as a cruise condition. The controller 91 is operable to determine deflection of the nacelle assembly 60 based on the change in the cross-sectional area.

The controller 91 can be operable to cause a performance characteristic of the engine 20 to change based upon the deflection, such as adjusting a power output of the engine 20 at a desired operating condition. In other examples, the calculated deflection can be utilized for adjusting flow and thrust performance calculations during design, testing or calibration.

Figure 6:
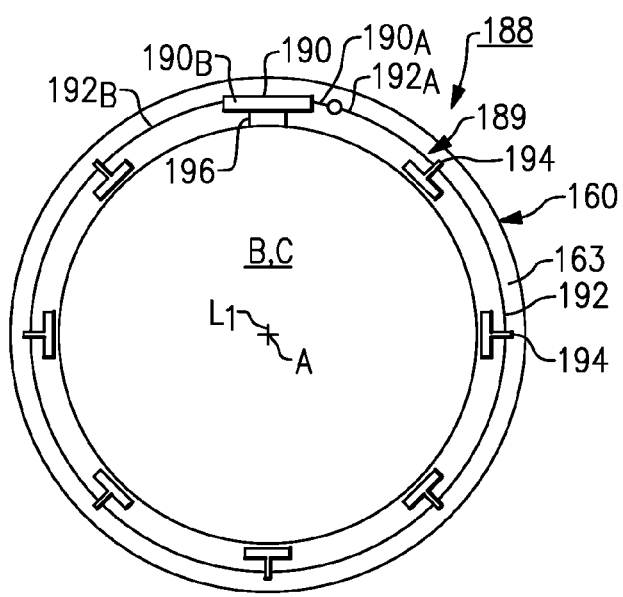
FIG. 6 illustrates a deflection measurement assembly according to a second embodiment.

FIG. 6 illustrates a deflection measurement assembly 188 according to a second example. Cable assembly 189 is situated at least partially within a cavity 163 of the nacelle assembly 160. The cavity 163 can be defined by trailing edge region $64_C$ of the fan nacelle 64 or a trailing edge region $62_C$ of the core cowling 62 (FIG. 2A), for example. Transducer 190 is coupled to first end $192_A$ and second end $192_B$ of cable 192 to form a substantially full loop. The mount 196 is configured to permit the transducer 190 to move relative to the nacelle assembly 160.

Figure 7:
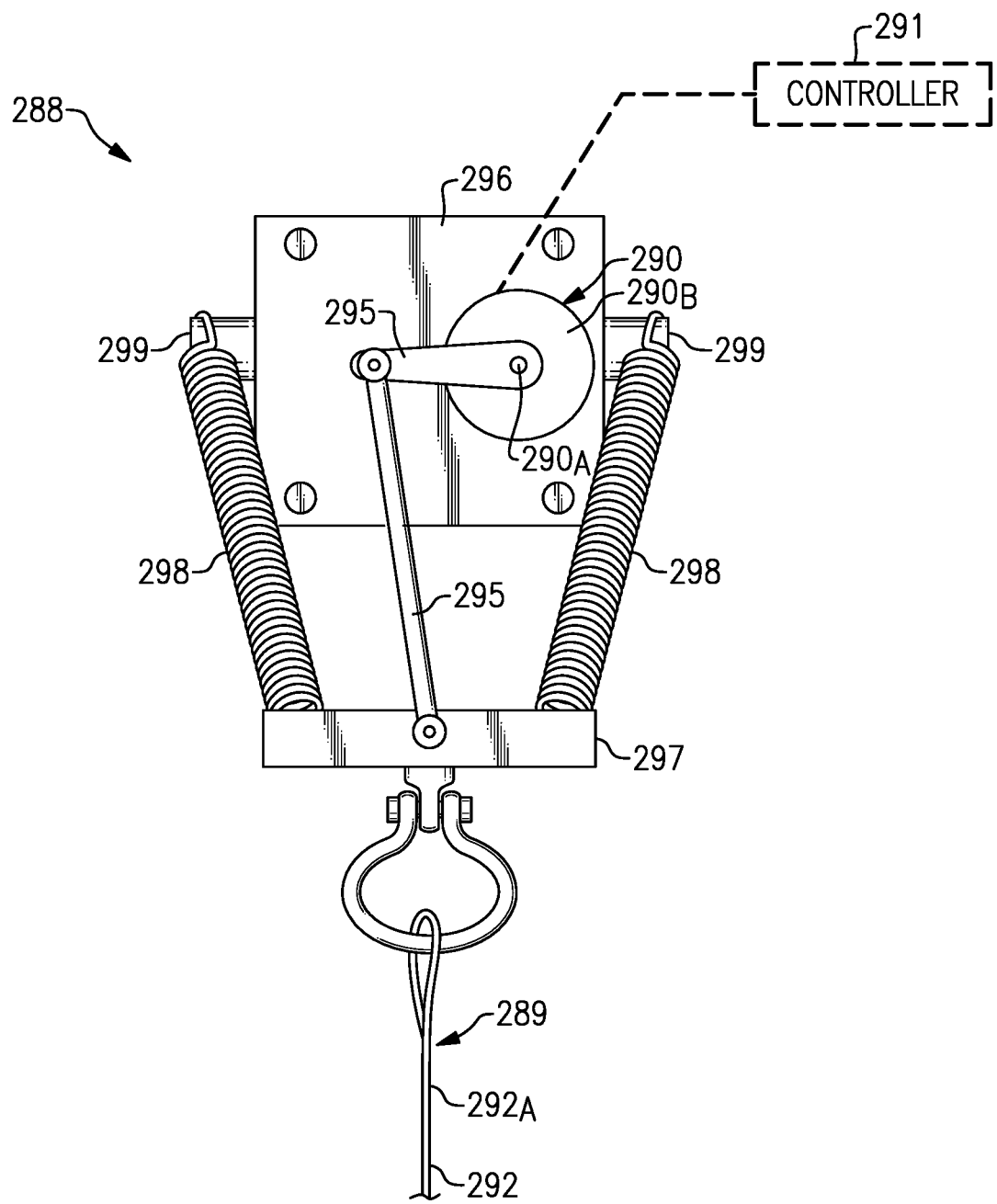
FIG. 7 illustrates a plan view of a deflection measurement assembly according to a third embodiment.

FIG. 7 illustrates a plan view of a deflection measurement assembly 288 according to a third embodiment. Transducer 290 can be a rotary variable differential transducer (RVDT). Actuator $290_A$ extends outward from body $290_B$. For example, the actuator $290_A$ can extend radially outwardly with respect to engine axis A (FIG. 2). In alternative examples, the the actuator $290_A$ can extend in the circumferential direction with respect to engine axis A (FIG. 2). The actuator $290_A$ is offset from, and pivotably coupled to, cable 292 of cable assembly 289 by one or more linkage arms 295. Movement of cable 292 causes the linkage arms 295 to rotate actuator $290_A$. Controller 291 is operable to determine a change in the cross-sectional area or also deflection based on comparing a radial displacement of actuator $290_A$.

It should be understood that relative positional terms such as "forward," "aft," "upper," "lower," "above," "below," and the like are with reference to the normal operational attitude of the vehicle and should not be considered otherwise limiting. Although the different examples have the specific components shown in the illustrations, embodiments of this disclosure are not limited to those particular combinations. It is possible to use some of the components or features from one of the examples in combination with features or components from another one of the examples. Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:
1. A propulsion system, comprising:
a gas turbine engine defining an engine axis, the engine including a turbine section configured to drive a fan section;
a nacelle assembly including a fan nacelle and a core cowling arranged about the engine axis to define a bypass flow path, and the core cowling defining a core flow path, the fan nacelle including a stationary first nacelle section and a second nacelle section, the second nacelle section axially moveable along the engine axis in a direction away from the first nacelle section such that the second nacelle section defines a radial opening to the bypass flow path; and
a deflection measurement assembly, comprising:

a cable assembly coupled to the nacelle assembly, wherein the cable assembly includes at least one cable disposed at least partially about a perimeter of the second nacelle section; and a transducer coupled to the cable assembly, the transducer configured to be actuated in response to a change in a cross-sectional area of at least one of the bypass flow path and the core flow path.

2. The propulsion system as recited in claim 1, wherein the transducer is a linear variable differential transducer.

3. The propulsion system as recited in claim 1, wherein the cable assembly is arranged at least partially about the engine axis.

4. The propulsion system as recited in claim 1, comprising a controller coupled to the transducer, the controller operable to determine a deflection of the nacelle assembly based upon the change in the cross-section area.

5. The propulsion system as recited in claim 1, wherein the fan nacelle is fixedly attached to a pylon, the transducer is coupled to a first end of the at least one cable, and a second end of the at least one cable is coupled to the pylon.

6. The propulsion system as recited in claim 2, comprising:

a controller coupled to the transducer, the controller operable to determine a deflection of the nacelle assembly based upon the change in the cross-section area.

7. A method of measuring deflection of a nacelle assembly, comprising:

providing a nacelle defining a flow path that extends along an engine axis, the nacelle including a stationary first nacelle section and a second nacelle section, the second nacelle section axially moveable along the axis in a direction away from the first nacelle section such that the second nacelle section a radial opening to the flow path;

positioning a cable assembly about the engine axis, the cable assembly moveable relative to the axis in response to a change in a cross-sectional area of the flow path, wherein the cable assembly includes at least one cable disposed at least partially about a perimeter of the second nacelle section; and actuating a transducer is response to movement of the cable assembly.

8. The method as recited in claim 7, wherein the transducer is coupled to a first end of the at least one cable.

9. The method as recited in claim 7, comprising determining a deflection of the nacelle at a location adjacent to the cable assembly based upon the step of actuating the transducer.

10. The method as recited in claim 9, wherein the step of determining the deflection of the nacelle includes comparing the change in the cross-section area to a predetermined quantity.

11. The propulsion system as recited in claim 6, wherein the fan nacelle is fixedly attached to a pylon, the transducer is coupled to a first end of the at least one cable, and a second end of the at least one cable is coupled to the pylon.

\* \* \* \* \*